US011525521B2

(12) United States Patent
Tanaka

(10) Patent No.: US 11,525,521 B2
(45) Date of Patent: Dec. 13, 2022

(54) CONTROL DEVICE FOR VALVE DEVICE

(71) Applicant: DENSO CORPORATION, Kariya (JP)

(72) Inventor: Yosuke Tanaka, Kariya (JP)

(73) Assignee: DENSO CORPORATION, Kariya (JP)

(*) Notice: Subject to any disclaimer, the term of this patent is extended or adjusted under 35 U.S.C. 154(b) by 147 days.

(21) Appl. No.: 16/906,066

(22) Filed: Jun. 19, 2020

(65) Prior Publication Data
US 2020/0318751 A1 Oct. 8, 2020

Related U.S. Application Data

(63) Continuation of application No. PCT/JP2018/046592, filed on Dec. 18, 2018.

(30) Foreign Application Priority Data

Dec. 22, 2017 (JP) ............... JP2017-246016

(51) Int. Cl.
F16K 31/04 (2006.01)
F16K 37/00 (2006.01)
F01P 7/14 (2006.01)

(52) U.S. Cl.
CPC ........ *F16K 31/041* (2013.01); *F16K 37/0041* (2013.01); *F01P 7/14* (2013.01); *F01P 2007/146* (2013.01)

(58) Field of Classification Search
None
See application file for complete search history.

(56) References Cited

U.S. PATENT DOCUMENTS

| 2015/0149100 A1* | 5/2015 | Eisenbeis | F16K 31/04 |
| | | | 702/58 |
| 2016/0084143 A1* | 3/2016 | Lee | F01P 7/14 |
| | | | 123/41.08 |
| 2018/0230891 A1 | 8/2018 | Sato | |
| 2019/0195119 A1 | 6/2019 | Sato | |

FOREIGN PATENT DOCUMENTS

| JP | 2012-26288 | | 2/2012 |
| JP | 2012026288 A | * | 2/2012 |

OTHER PUBLICATIONS

2012026288A, Toshiaki, Machine Translation, 2012 (Year: 2012).*

* cited by examiner

*Primary Examiner* — Daphne M Barry
(74) *Attorney, Agent, or Firm* — Nixon & Vanderhye P.C.

(57) ABSTRACT

An instruction duty computation unit computes an instruction duty ratio representing a ratio between an energization time and a non-energization time of a motor based on an actual rotation angle detected by a rotation angle sensor and a target rotation angle of a valve member. The rotation angle sensor detects an actual rotation angle of a valve member of a fluid control valve. A stress computation unit computes a valve member load torque of the valve member based on the actual rotation angle and an actual duty ratio of the motor. An actual duty computation unit computes a new value of the actual duty ratio based on an instruction duty ratio computed by using an instruction duty computation unit and a valve member load torque computed by using a stress computation unit.

12 Claims, 8 Drawing Sheets

CONTROL DEVICE FOR VALVE DEVICE

CROSS REFERENCE TO RELATED APPLICATION

The present application is a continuation application of International Patent Application No. PCT/JP2018/046592 filed on Dec. 18, 2018, which designated the U.S. and claims the benefit of priority from Japanese Patent Application No. 2017-246016 filed on Dec. 22, 2017. The entire disclosures of all of the above applications are incorporated herein by reference.

TECHNICAL FIELD

The present disclosure relates to a control device for valve device.

BACKGROUND

Conventionally, a control device is provided to control rotation of a valve member of a valve device thereby to control a flow of fluid.

SUMMARY

According to an aspect of the present disclosure, a valve device includes a valve housing and a valve member. The valve housing has an internal space and multiple housing-side openings that are to communicate the internal space with the outside of the valve housing. The valve member is rotationally accommodated in the valve housing and is configured to communicate and discommunicate the housing-side openings with the internal space.

The valve device further includes a driving device and a rotation angle detector. The driving device is configured to generate a driving force by using externally supplied electric power to rotate the valve member. The rotation angle detector is configured to detect an actual rotation angle of the valve member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
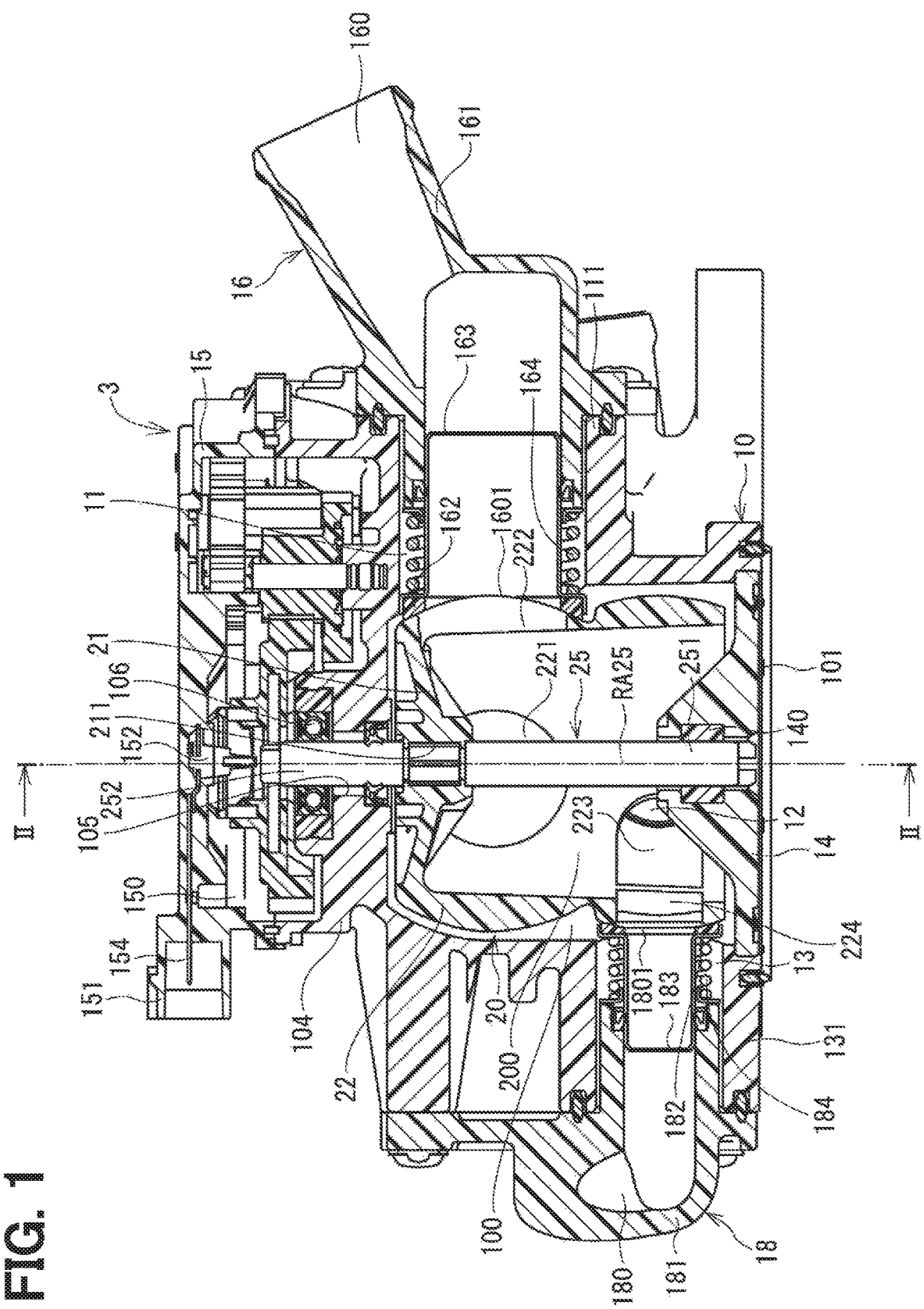
FIG. 1 is a cross sectional view illustrating a valve device concerning the control device for valve device according to an embodiment.

To begin with, examples of the present disclosure will be described.

According to an example of the present disclosure, a control device is provided to control rotation of a valve member of a valve device thereby to control a flow of fluid. The control device includes a valve device and a control unit. The valve device further includes a detection portion to detect rotation angles of a valve member.

According to an example, the control unit may include a duty ratio computation unit and a determination portion. The duty ratio computation unit may compute a duty ratio based on a difference between a rotation angle detected from the detection portion and an instruction value for the rotation angle. In this example, the duty ratio represents a ratio of periods during which the voltage to be applied to an electric motor is turned on and off. Moreover, the duty ratio computation unit may limit the duty ratio to a predetermined upper limit or lower. The determination portion may determine whether the duty ratio keeps the upper limit for a predetermined period.

According to an assumable example, the control device for valve device may provide a predetermined upper limit for the duty ratio before the practical use of the control device. However, in this assumable example, it could be difficult to anticipate the number of occurrences of irregular events such as entry of a foreign substance in a portion between the valve member and a valve housing that contains the valve member or freezing of fluid during the practical use. Therefore, this configuration may hardly allow to set the predetermined upper limit to an appropriate value before the practical use. This configuration therefore may hardly enable full use of the performance of the valve member if the upper limit is set to a small value in consideration of irregular events, for example.

According to an example of the present disclosure, a control device is for a valve device that is configured to control driving of the valve device. The valve device includes a valve housing that has an internal space and a plurality of housing-side openings to communicate the internal space with an outside of the valve housing. The valve device further includes a valve member that is rotationally accommodated in the valve housing and is configured to communicate and discommunicate the plurality of housing-side openings with the internal space. The valve device further includes a driving device that is configured to generate a driving force by using externally supplied electric power to rotate the valve member. The valve device further includes a rotation angle detector that is configured to detect an actual rotation angle of the valve member.

The control device includes an instruction duty computation unit configured to compute an instruction duty ratio representing a ratio between an energization time and a non-energization time of the driving device based on an actual rotation angle detected by using the rotation angle detector and a target rotation angle of the valve member. The control device further includes a stress computation unit configured to compute a stress on the valve member based on the actual rotation angle and an actual duty ratio sent to the driving device. The control device further includes an actual duty computation unit configured to compute a new value of the actual duty ratio based on the instruction duty ratio computed by using the instruction duty computation unit and the stress computed by using the stress computation unit.

According to an example, the instruction duty computation unit computes the instruction duty ratio representing the ratio between the energization time and the non-energization time of the driving device based on the actual rotation angle detected by the rotation angle detector and the target rotation angle of the valve member.

According to an example, the stress computation unit computes the stress on the valve member based on the actual rotation angle and the actual duty ratio sent to the driving device. The actual duty computation unit computes the new value of the actual duty ratio based on the instruction duty ratio computed by using the instruction duty computation unit and the stress computed by using the stress computation unit.

According to an example, the control device for the valve device includes the stress computation unit to compute the stress on the valve member and the actual duty computation unit to compute the actual duty ratio output to the driving device. The stress computation unit computes the stress on the valve member based on the actual rotation angle and the actual duty ratio of the driving device. Normally, the valve device may determine the actual rotation angle by using the actual duty ratio of the driving device. It is noted that, the actual duty of the driving device may disagree with the actual rotation angle on the occurrence of an event that causes the valve member to rotate abnormally such as entry of a foreign substance or freezing of fluid. As a solution, the stress computation unit may use the relationship between the actual duty ratio of the driving device and the actual rotation angle to compute the stress on the valve member such as a load torque acting on the valve member to restrict the rotation of the valve member, for example. The actual duty computation unit computes the new value of the actual duty ratio that is newly sent to the driving device based on the instruction duty ratio computed by using the duty computation unit and the stress computed by using the stress computation unit. The driving device drives the valve member based on the actual duty ratio.

According to an example, the control device for valve device may drive the valve member based on the actual duty ratio that is computed as needed according to the amount of stress on the valve device during the practical use. This configuration may enable to restrict its driving from acting insomuch that causes excessive stress to cause malfunction in the valve device. This configuration may enable to reliably restrict failures on the valve device.

It is further noted that an assumable configuration may enable to restrict the valve device from malfunctioning by relatively lowering the upper limit of the actual duty ratio before the practical use when the priority is to restrict failures on the valve device. However, the responsiveness of the valve device may decrease if the upper limit of the actual duty ratio is relatively lowered. In the control device for valve device according to the example, the actual duty computation unit computes the new value of the actual duty ratio that may be sufficient to restrict the valve device from malfunctioning with the addition of the stress computed by using the stress computation unit to the instruction duty ratio computed by using the instruction duty computation unit such that the valve member is driven. The valve device may thereby enable maintain responsiveness.

The control device according to the present disclosure may enable to maintain better responsiveness while restricting failures on the valve device by allowing the stress computation unit to compute the amount of stress on the valve device and to settle an actual duty ratio based on the computation result.

EMBODIMENT

The embodiment will be described with reference to the accompanying drawings. According to the embodiment, a fluid control system 5 as a "fluid control system" includes a control unit 1 as a "control device for valve device" and a fluid control valve 3 as a "valve device." The fluid control system 5 is applied to a cooling system 90 that cools an engine 91.

Figure 3:
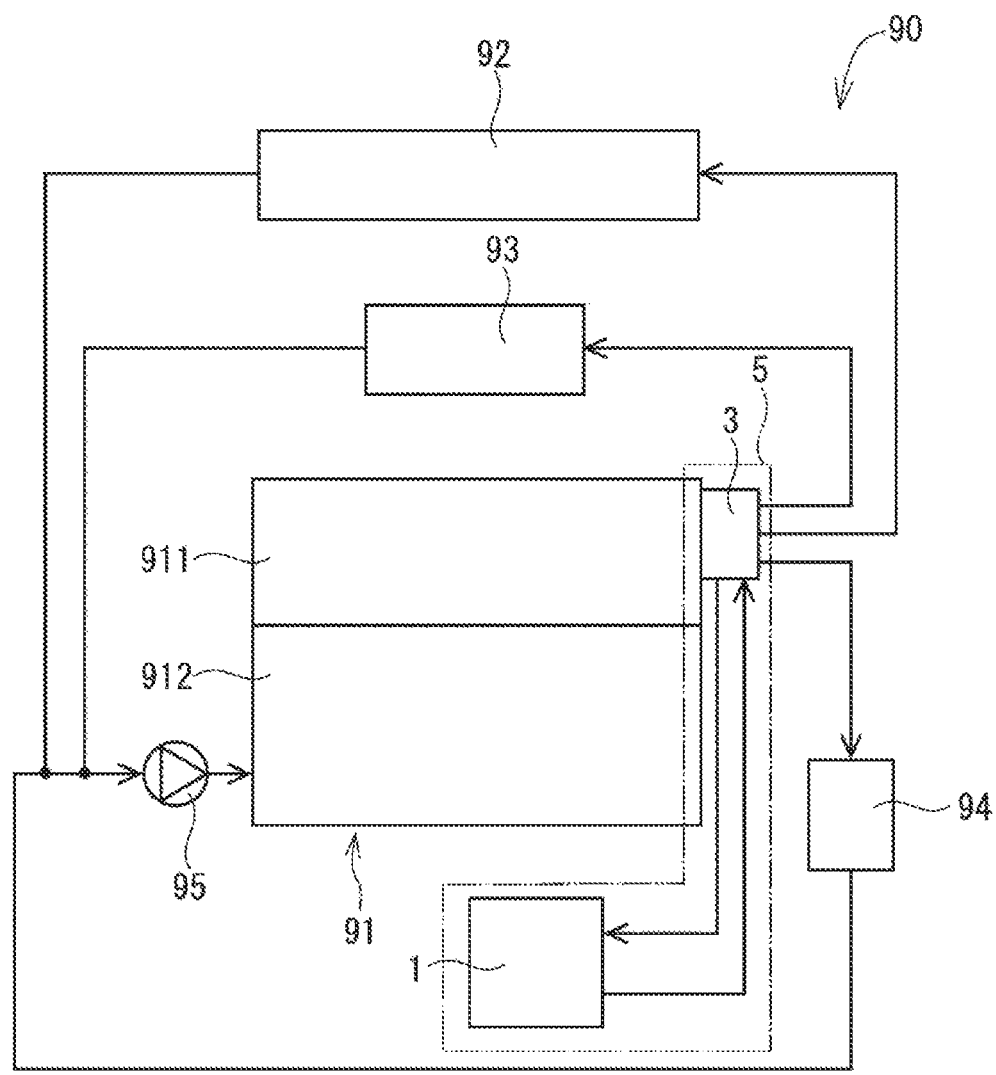
FIG. 3 is a schematic diagram illustrating a cooling system concerning the control device for valve device according to the embodiment.

Based on FIG. 3, the description below explains the cooling system 90 to which the fluid control system 5 is applied. The fluid control system 5 is provided for a cylinder head 911 included in the engine 91. Cooling water enters the control unit 1 and flows through a cylinder block 912 and the cylinder head 911 included in the engine 91. The cooling water flows into the fluid control valve 3 and is supplied to a radiator 92, an oil cooler 93, and a heat exchanger for air conditioning 94. The cooling water supplied to the radiator 92, the oil cooler 93, and the heat exchanger for air conditioning 94 is returned to and is compressed by a water pump 95. The cooling water is then reused to cool the engine 91.

Figure 4:
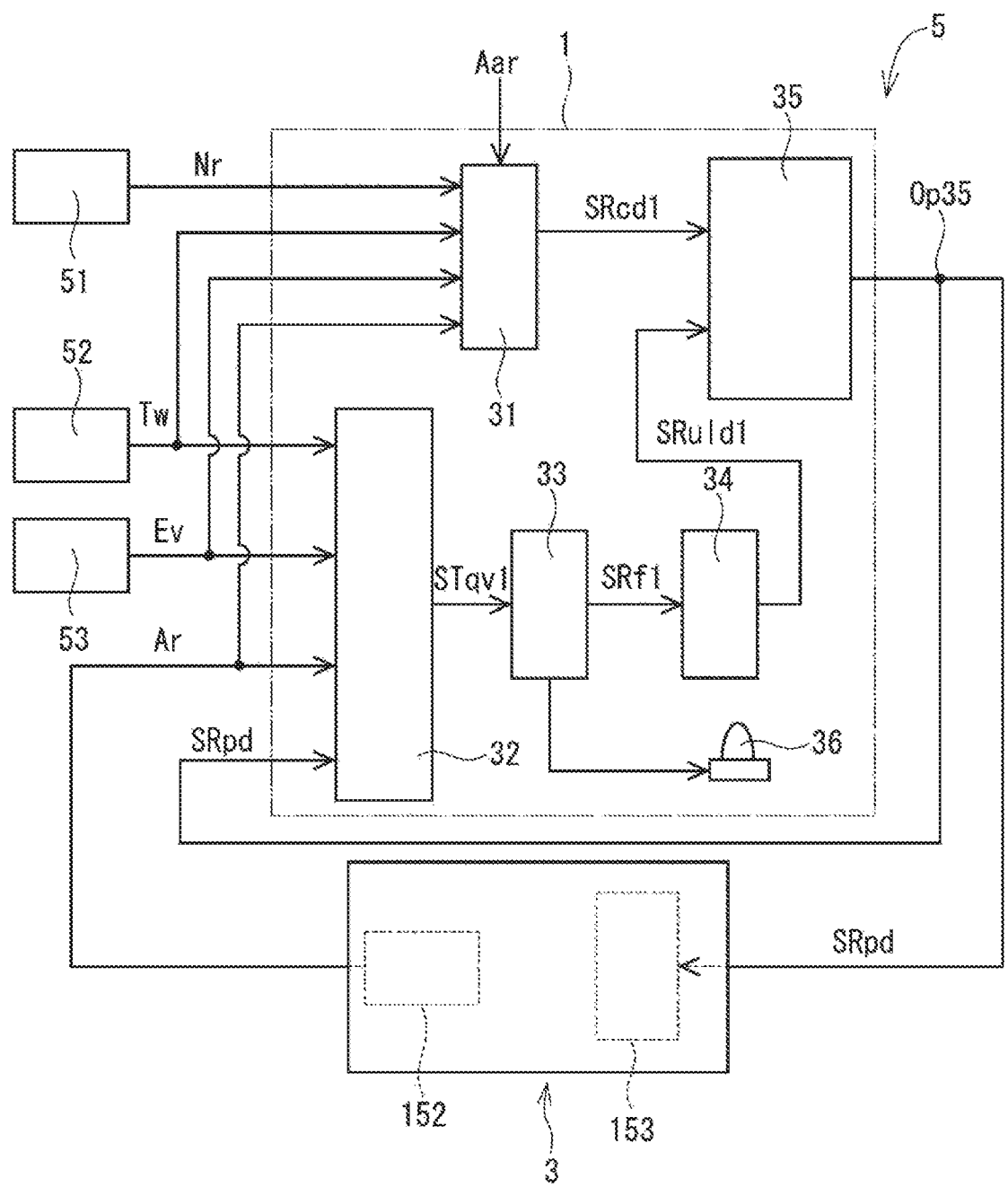
FIG. 4 is a block diagram illustrating the control device for valve device according to the embodiment.

As illustrated in FIG. 4, the fluid control system 5 mainly includes the control unit 1, the fluid control valve 3, an engine rotation sensor 51, a water temperature sensor 52, and a voltmeter 53.

The control unit 1 electrically connects with the fluid control valve 3 and various sensors of a vehicle. The control unit 1 controls driving of the fluid control valve 3 based on signals that represent vehicle states and are mainly output from the engine rotation sensor 51, the water temperature sensor 52, and the voltmeter 53. A configuration and operations of the control unit 1 will be described in detail later.

Figure 2:
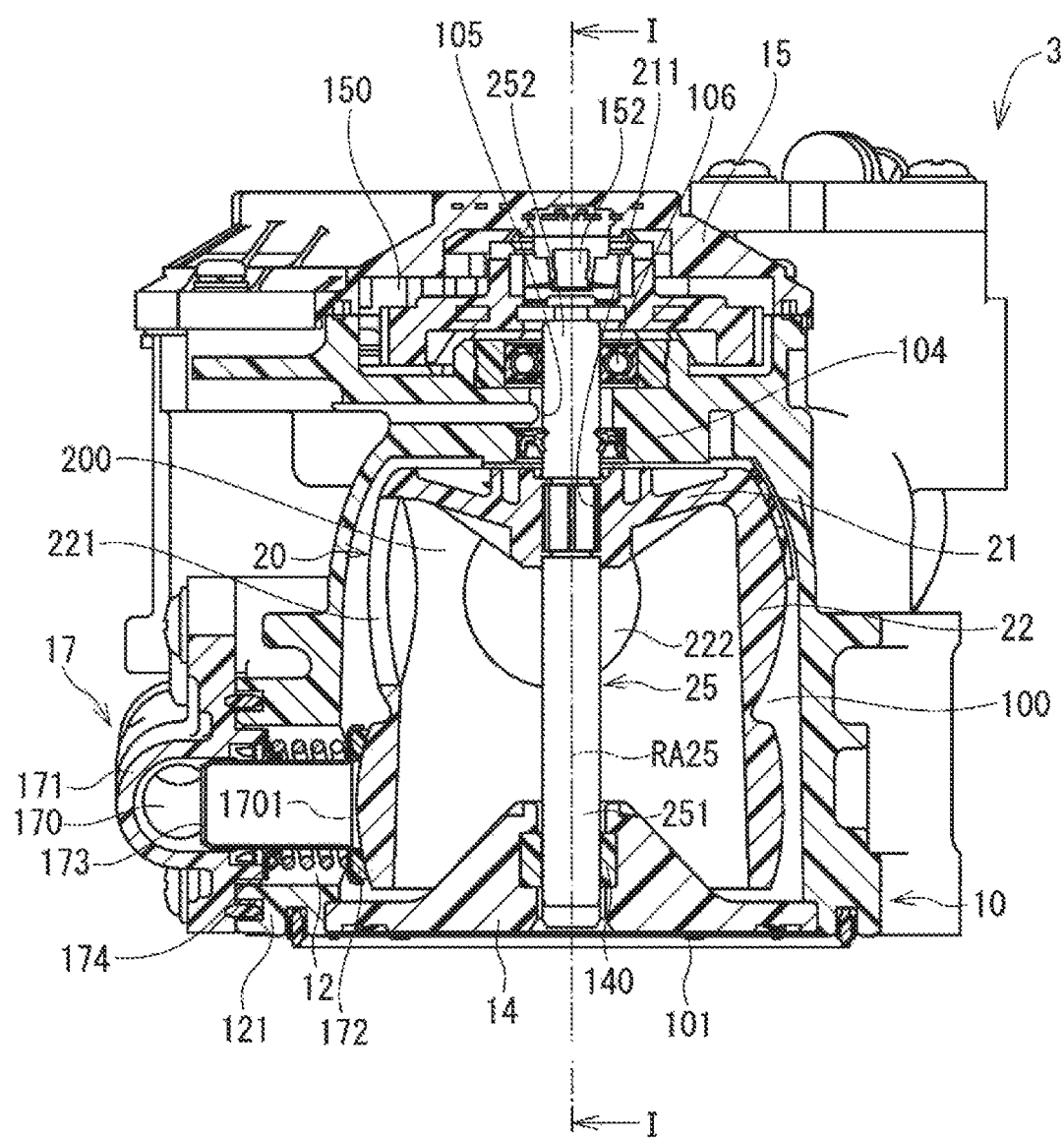
FIG. 2 is a cross sectional view taken along the line II-II of FIG. 1.

As illustrated in FIGS. 1 and 2, the fluid control valve 3 includes a first housing 10 as a "valve housing," a bearing 14, a second housing 15 as the "valve housing," a radiator piping 16 as the "valve housing," an oil cooler piping 17 as the "valve housing," an air conditioning piping 18 as the "valve housing," a valve member 20, and a shaft 25.

The first housing 10 is a member made of resin and is approximately formed into a bottomed cylinder. The first housing 10 includes a valve member placement space 100 as an approximately columnar "internal space" capable of containing the valve member 20. The first housing 10 includes an insertion hole 101 as a "housing-side opening." The insertion hole 101 is communicated with the valve member placement space 100 and serves as an entry for the cooling water to enter the valve member placement space 100 from the engine. The first housing 10 includes three insertion holes 11, 12, and 13 in the radial direction of the valve member placement space 100 outward. The insertion hole 11 is capable of insertion of the radiator piping 16 therethrough. The insertion hole 12 is capable of insertion of the oil cooler piping 17 therethrough. The insertion hole 13 is capable of insertion of the air conditioning piping 18 therethrough.

A housing bottom portion 104 includes a through-hole 105 approximately at the center. The through-hole 105 allows the shaft 25 and an end portion 252 of the shaft 25 to be inserted. An internal wall of the through-hole 105 is provided with a bearing portion 106. The bearing portion 106 rotationally supports the end portion 252 of the shaft 25.

The bearing 14 is provided to the insertion hole 101. The bearing 14 includes a bearing portion 140 that rotationally supports an end portion 251 of the shaft 25.

The second housing 15 is provided at a side opposite the side where the insertion hole 101 of the first housing 10 is formed. The second housing 15 includes a connector 151. The second housing 15 forms an accommodation chamber 150 capable of accommodating a plurality of gears between the second housing 15 and the first housing 10. The gears are coupled with a rotation angle sensor 152 as a "rotation angle detector," the shaft 25, and a motor 153 as a "driving device" (see FIG. 4).

The connector 151 includes a terminal 154 that electrically connects the rotation angle sensor 152 with the motor 153. The terminal 154 electrically connects with the control unit 1. The connector 151 outputs a signal output from the rotation angle sensor 152 to the control unit 1 and is capable of being supplied with the power from an external device so that the power is supplied to the motor 153.

The rotation angle sensor 152 is provided near the end portion 252 of the shaft 25. The rotation angle sensor 152 is configured to output a signal corresponding to a rotation angle as an "actual rotation angle" of the shaft 25 that is configured to rotate integrally with the valve member 20.

The motor 153 is a direct-current motor and is provided to be capable of outputting a drive torque based on actual duty ratio Rpd output from the control unit 1. The drive torque output from the motor 153 is transmitted to the shaft 25 via the gears accommodated in the accommodation chamber 150.

The shaft is approximately formed into a rod made of metal and includes the end portion 251 as one end and the end portion 252 as the other end. The end portion 251 is inserted into the bearing 14 and is rotationally supported by the bearing portion 140. The end portion 252 is inserted into the housing bottom portion 104 and is rotationally supported by the bearing portion 106.

The radiator piping 16 includes a radiator pipe 161, a sheet 162 as a "valve-housing internal wall," a sleeve 163, and a spring 164. The radiator pipe 161 is approximately formed into a cylinder to include a radiator pathway 160 and is fixed to an opening portion 111 of the first housing 10. The sheet 162 is provided independently of the radiator pipe 161 and is available as an approximately ring-shaped member made of PTFE, for example. The sheet 162 includes a housing-side opening 1601. The sheet 162 is provided to be slidable against an external wall of the valve member 20.

The sleeve 163 is an approximately cylindrical member provided between the radiator pipe 161 and the sheet 162. The end portion of the sleeve 163 is inserted into the radiator pathway 160 toward the radiator pipe 161. The sleeve 163 supports the sheet 162.

The spring 164 presses the sheet 162 in a direction to be distant from the radiator pipe 161 from the sheet 162. The sheet 162 thereby slides against the external wall of the valve member 20 to maintain the liquid tightness between the insertion hole 11 and the inside of the valve member 20 and the inside of the sleeve 163.

The oil cooler piping 17 includes an oil cooler pipe 171, a sheet 172 as a "valve-housing internal wall," a sleeve 173, and a spring 174. The oil cooler pipe 171 is shaped into an approximate cylinder to include an oil cooler pathway 170 and is fixed to an opening portion 121 of the first housing 10. The sheet 172 is provided independently of the oil cooler pipe 171 and is available as an approximately ring-shaped member made of PTFE, for example. The sheet 172 includes a housing-side opening 1701. The sheet 172 is provided to be slidable against the external wall of the valve member 20.

The sleeve 173 is an approximately cylindrical member provided between the oil cooler pipe 171 and the sheet 172. The end portion of the sleeve 173 is inserted into the oil cooler pathway 170 toward the oil cooler pipe 171. The sleeve 173 supports the sheet 172.

The spring 174 presses the sheet 172 in a direction to be distant from the oil cooler pipe 171 from the sheet 172. The sheet 172 thereby slides against the external wall of the valve member 20 to maintain the liquid tightness between the insertion hole 12 and the inside of the valve member 20 and the inside of the sleeve 173.

The air conditioning piping 18 includes an air conditioning pipe 181, a sheet 182 as a "valve-housing internal wall," a sleeve 183, and a spring 184. The air conditioning pipe 181 is shaped into an approximate cylinder to include an air conditioning pathway 180 and is fixed to an opening portion 131 of the first housing 10. The sheet 182 is provided independently of the air conditioning pipe 181 and is available as an approximately ring-shaped member made of PTFE, for example. The sheet 182 includes a housing-side opening 1801. The sheet 182 is provided to be slidable against the external wall of the valve member 20.

The sleeve 183 is an approximately cylindrical member provided between the air conditioning pipe 181 and the sheet 182. The end portion of the sleeve 183 is inserted into the air conditioning pathway 180 toward the air conditioning pipe 181. The sleeve 183 supports the sheet 182.

The spring 184 presses the sheet 182 in a direction that separates the air conditioning pipe 181 from the sheet 182. The sheet 182 thereby slides against the external wall of the valve member 20 to maintain the liquid tightness between the insertion hole 13 and the inside of the valve member 20 and the inside of the sleeve 183.

The valve member 20 is shaped into an approximately bottomed cylinder made of resin and is contained in the valve member placement space 100. Rotation axis RA25 of the shaft 25 is positioned over the center axis of the valve member 20. The valve member 20 includes a valve member bottom portion 21 and a cylindrical portion 22. The valve member 20 internally includes a space 200 formed by the valve member bottom portion 21 and the cylindrical portion 22.

The valve member bottom portion 21 is provided at a position facing the housing bottom portion 104 of the valve member placement space 100. The valve member bottom portion 21 includes a through-hole 211 approximately at the center so that the shaft 25 can be inserted. Insertion of the shaft 25 into the through-hole 211 restricts the valve member 20 and the shaft 25 from moving relatively. The valve member 20 and the shaft 25 can rotate integrally.

The cylindrical portion 22 is formed to extend from the valve member bottom portion 21 in a direction opposite the housing bottom portion 104. The cylindrical portion 22 includes valve member side openings 221, 222, 223, and 224 communicating the space 200 and the outside of the cylindrical portion 22. The valve member side openings 221 and 222 are formed in the cylindrical portion 22 toward the valve member bottom portion 21. The valve member side openings 221 and 222 are formed to be capable of being communicated with the radiator pathway 160 according to rotation angles of the valve member 20. The valve member side opening 223 is formed to be capable of being communicated with the oil cooler pathway 170 according to rotation angles of the valve member 20. The valve member side opening 224 is formed to be capable of being communicated with the air conditioning pathway 180 according to rotation angles of the valve member 20.

The engine rotation sensor 51 detects a rotation speed of the engine 91 and outputs rotation speed signal Nr corresponding to the rotation speed to the electrically connected control unit 1 (see FIG. 4). The water temperature sensor 52 detects the temperature of cooling water for the engine 91 and outputs water temperature signal Tw corresponding to the water temperature to the electrically connected control unit 1 (see FIG. 4). The voltmeter 53 detects the voltage of an unshown battery and outputs voltage signal Ev corresponding to the voltage to the electrically connected control unit 1 (see FIG. 4).

With reference to FIGS. 4 through 8, the description below explains a configuration of the control unit 1 and the contents of arithmetic processing for each portion.

The control unit 1 includes a microcomputer. The microcomputer provides a small-size computer including a CPU as an arithmetic means and ROM and RAM as a storage means, for example. The microcomputer performs according to various programs stored in the ROM under control of the CPU. Processes in the control unit 1 may be implemented as software by allowing the CPU to execute programs in advance stored in a tangible memory device such as ROM; or as hardware through the use of dedicated electronic circuits. As illustrated in FIG. 4, the control unit 1 includes an instruction duty computation unit 31, a stress computation unit 32, a life computation unit 33, an upper limit computation unit 34, an actual duty computation unit 35, and an alarm device 36.

The instruction duty computation unit 31 electrically connects with the engine rotation sensor 51, the water temperature sensor 52, the voltmeter 53, and the rotation angle sensor 152. The instruction duty computation unit 31 is supplied with rotation speed signal Nr, water temperature signal Tw, voltage signal Ev, and rotation angle signal Ar. Rotation speed signal Nr corresponds to the rotation speed of the engine 91 output from the engine rotation sensor 51. Water temperature signal Tw corresponds to the water temperature output from the water temperature sensor 52. Voltage signal Ev corresponds to the battery voltage output from the voltmeter 53. Rotation angle signal Ar corresponds to the actual rotation angle of the valve member 20 output from the rotation angle sensor 152. The instruction duty computation unit 31 is supplied with signal Aar corresponding to a target rotation angle for the valve member 20 output from an unshown ECU of the vehicle mounted with the engine 91. The instruction duty computation unit 31 computes a duty ratio representing a ratio of periods during which the motor 153 is turned on or off. The duty ratio is computed based on rotation speed signal Nr, water temperature signal Tw, voltage signal Ev, rotation angle signal Ar, and signal Aar corresponding to the target rotation angle. The instruction duty computation unit 31 outputs instruction duty ratio signal SRcd1 to the actual duty computation unit 35. Instruction duty ratio signal SRcd1 corresponds to instruction duty ratio Rcd1 as computed duty ratio ("instruction duty ratio") Rcd.

Figure 5:
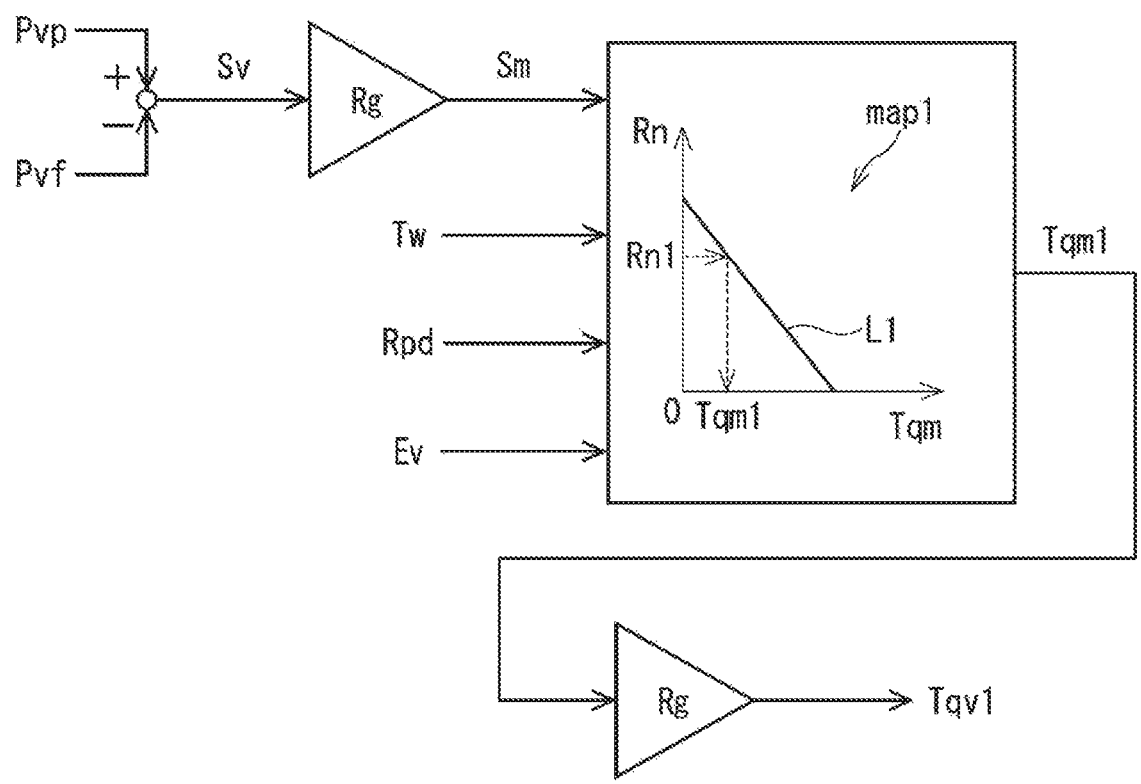
FIG. 5 is a block diagram illustrating a stress computation unit included in the control device for valve device according to the embodiment.
Figure 6:
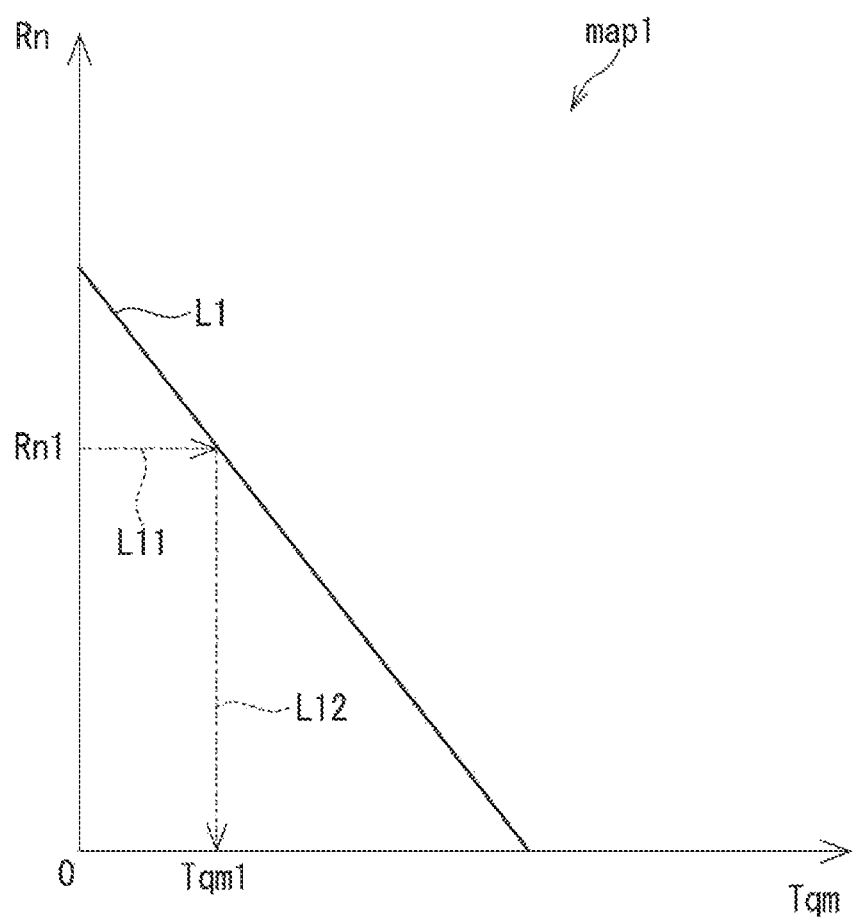
FIG. 6 illustrates a characteristic chart of a motor included in the control device for valve device according to the embodiment.

The stress computation unit 32 electrically connects with output terminal Op35 for the water temperature sensor 52, the voltmeter 53, the rotation angle sensor 152, and the actual duty computation unit 35. With reference to FIGS. 5 and 6, the description below explains the contents of arithmetic processing in the stress computation unit 32. FIG. 5 is a block diagram illustrating a method of computing valve member load torque Tqv in the stress computation unit 32.

FIG. 6 is a characteristics diagram illustrating a relationship between motor load torque Tqm and rotation speed Rn for the motor 153.

The stress computation unit 32 computes current position Pvp of the valve member 20 based on rotation angle signal Ar output from the rotation angle sensor 152. The stress computation unit 32 stores position Pvf of the valve member 20 at the time earlier than the present. As illustrated in FIG. 5, the stress computation unit 32 computes rotation speed Sv of the valve member 20 based on a difference between current position Pvp of the valve member 20 and position Pvf of the valve member 20 at the time earlier than the present. The stress computation unit 32 computes rotation speed Sm of the motor 153 based on computed rotation speed Sv of the valve member 20 with the addition of gear ratio Rg of the gears coupling the shaft 25 and the motor 153.

The stress computation unit 32 is supplied with water temperature signal Tw output from the water temperature sensor 52, voltage signal Ev output from the voltmeter 53, and signal ("actual duty signal") SRpd corresponding to actual duty ratio Rpd supplied from output terminal Op35 of the actual duty computation unit 35. Voltage signal Ev and actual duty signal SRpd may be used to compute actual voltage Ea sent to the motor 153.

The stress computation unit 32 computes motor load torque Tqm1 of the motor 153 at a particular time through the use of motor characteristics map map1 based on computed rotation speed Sm of the motor 153, water temperature signal Tw, and actual voltage Ea.

The characteristics diagram in FIG. 6 uses the horizontal axis representing motor load torque Tqm and the vertical axis representing rotation speed Rn. The relationship between motor load torque Tqm and rotation speed Rn varies with the cooling water temperature for the engine 91 or actual voltage Ea. The cooling water temperature may be computed based on water temperature signal Tw. Solid line L1 in FIG. 6 illustrates the relationship between motor load torque Tqm and rotation speed Rn at particular water temperature and actual voltage. Beside solid line L1 in FIG. 6, the stress computation unit 32 is in advance supplied with data concerning the relationship between motor load torque Tqm and rotation speed Rn in terms of water temperatures and actual voltages estimated in a situation to use the fluid control valve 3.

The stress computation unit 32 determines a unique relationship between motor load torque Tqm and rotation speed Rn on the characteristics diagram in FIG. 6 based on water temperature signal Tw, voltage signal Ev, and the signal corresponding to the size of actual duty ratio Rpd as inputs. For example, the stress computation unit 32 determines the relationship as illustrated by solid line L1. The stress computation unit 32 then plots rotation speed Rn along the vertical axis to be computed based on rotation speed Sm of the motor 153. For example, rotation speed Rn1 is determined. The stress computation unit 32 computes motor load torque Tqm1 corresponding to rotation speed Rn1 (dotted lines L11 and L12 in FIG. 6) on the characteristics diagram in FIG. 6.

Returning to FIG. 5, the stress computation unit 32 computes valve member load torque Tqv1 of the valve member 20 based on the computed motor load torque Tqm1 with the addition of gear ratio Rg of the gears coupling the shaft 25 and the motor 153. The stress computation unit 32 outputs signal STqv1 corresponding to the size of valve member load torque Tqv1 to the life computation unit 33.

The stress computation unit 32 according to the present embodiment stops computing of motor load torque Tqm immediately after a change in actual duty ratio Rpd from actual duty ratio Rpd at the preceding time or during a certain period until the rotation of the valve member 20 stabilizes, for example.

The life computation unit 33 computes the life of the fluid control valve 3 based on valve member load torque Tqv1 output from the stress computation unit 32. The computation method will be described in detail based on FIG. 7.

Figure 7:
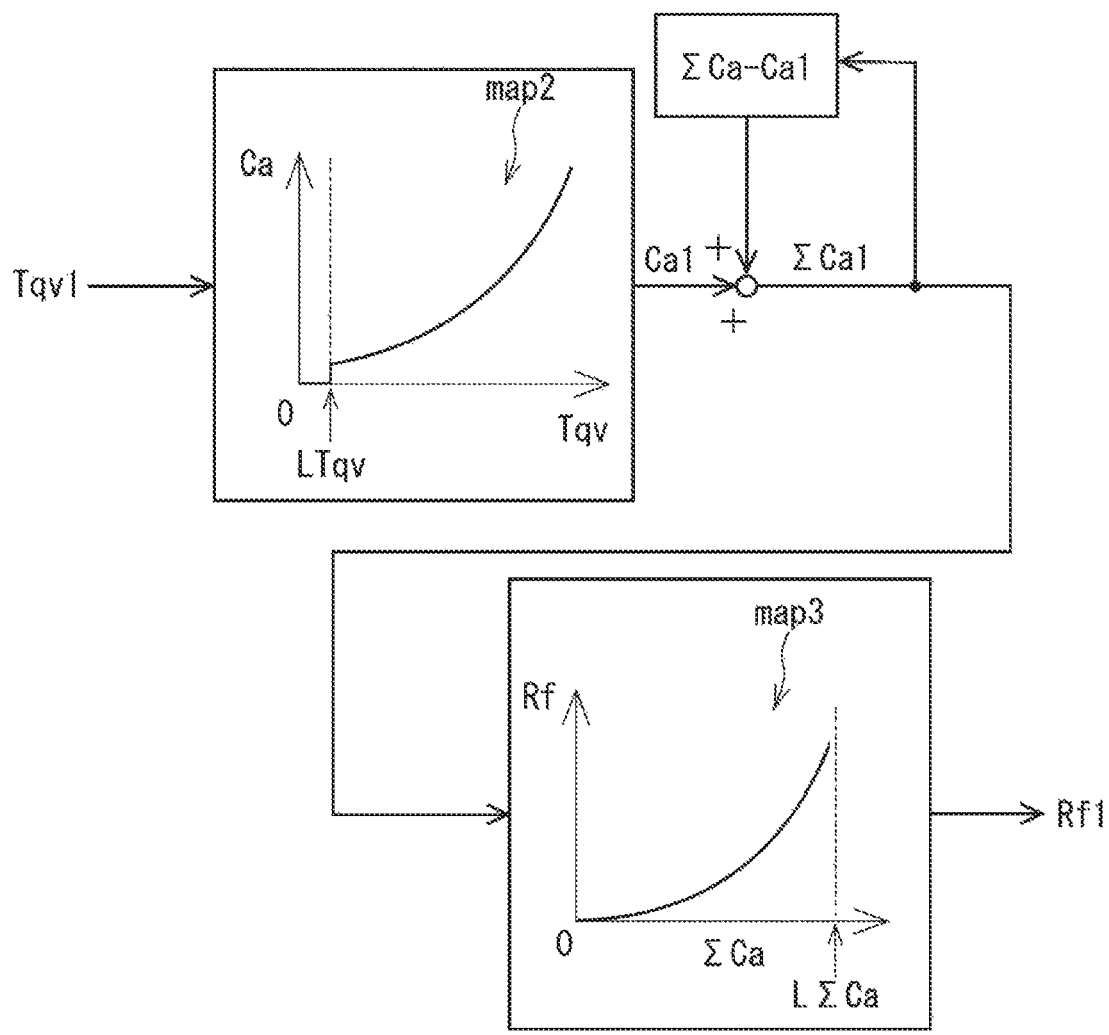
FIG. 7 is a block diagram illustrating a life computation unit included in the control device for valve device according to the embodiment.

The life computation unit 33 in advance includes fatigue characteristics map map2 representing the relationship between accumulative coefficient Ca and valve member load torque Tqv as a "stress of the valve member" and a "slide resistance of the valve member." As illustrated by fatigue characteristics map map2 in FIG. 7, accumulative coefficient Ca increases as valve member load torque Tqv increases. Accumulative coefficient Ca numerically represents the severity of damage accumulated in the valve member 20. The present embodiment increases the degree of increasing accumulative coefficient Ca as valve member load torque Tqv increases. The present embodiment provides valve member load torque Tqv with lower limit LTqv as a "lower limit of the stress." Accumulative coefficient Ca is assumed to be 0 when valve member load torque Tqv sent to the life computation unit 33 is smaller than valve member load torque Tqv. The life computation unit 33 computes accumulative coefficient Ca1 corresponding to valve member load torque Tqv1 based on fatigue characteristics map map2.

The life computation unit 33 adds the computed accumulative coefficient Ca1 and a total accumulative coefficient (ΣCa-Ca1) accumulated up to the previous time to compute the total accumulative coefficient ΣCa1 as a "total of accumulative coefficients" at the present time.

The life computation unit 33 in advance includes strength design map map3 that represents the relationship between total accumulative coefficient ΣCa and failure rate Rf. As illustrated in strength design map map3 of FIG. 7, failure rate Rf increases as total accumulative coefficient ΣCa increases. Failure rate Rf represents a failure rate, namely, the degree of failure of the fluid control valve 3 at the present. The present embodiment increases the degree of increasing failure rate Rf as total accumulative coefficient ΣCa increases. The life computation unit 33 computes failure rate Rf1 corresponding to total accumulative coefficient ΣCa1 based on strength design map map3. The life computation unit 33 outputs signal SRf1 corresponding to failure rate Rf1 to the upper limit computation unit 34.

The upper limit computation unit 34 computes upper-limit duty ratio Ruld based on failure rate Rf of the fluid control valve 3 computed by using the life computation unit 33 and an operating time Tu as an "operating history" of the fluid control valve 3. The description below explains in detail the computation method with reference to FIG. 8.

The upper limit computation unit 34 in advance includes fatigue characteristics map map4 representing the relationship between failure rate Rf and estimated failure rate Ref. As illustrated in fatigue characteristics map map4 of FIG. 8, estimated failure rate Ref increases as failure rate Rf increases. Estimated failure rate Ref represents an estimated failure rate based on failure rate Rf on the assumption that the vehicle including the fluid control valve 3 travels as long as a lifetime.

A change rate of estimated failure rate Ref to failure rate Rf depends on the operating time of the fluid control valve 3. Specifically, a change rate of estimated failure rate Ref corresponding to a relatively long operating time of the fluid control valve 3 is larger than a change rate of estimated failure rate Ref corresponding to a relatively short operating time of the fluid control valve 3. In fatigue characteristics map map4, solid line L2 represents the relationship between failure rate Rf and estimated failure rate Ref when the operating time of the fluid control valve 3 is relatively short. Dotted line L3 represents the relationship between failure rate Rf and estimated failure rate Ref when the operating time of the fluid control valve 3 is relatively long. The upper limit computation unit 34 settles fatigue characteristics map map4 based on the operating time of the fluid control valve 3. The upper limit computation unit 34 computes estimated failure rate Ref1 corresponding to failure rate Rf1 based on the settled fatigue characteristics map map4.

Figure 8:
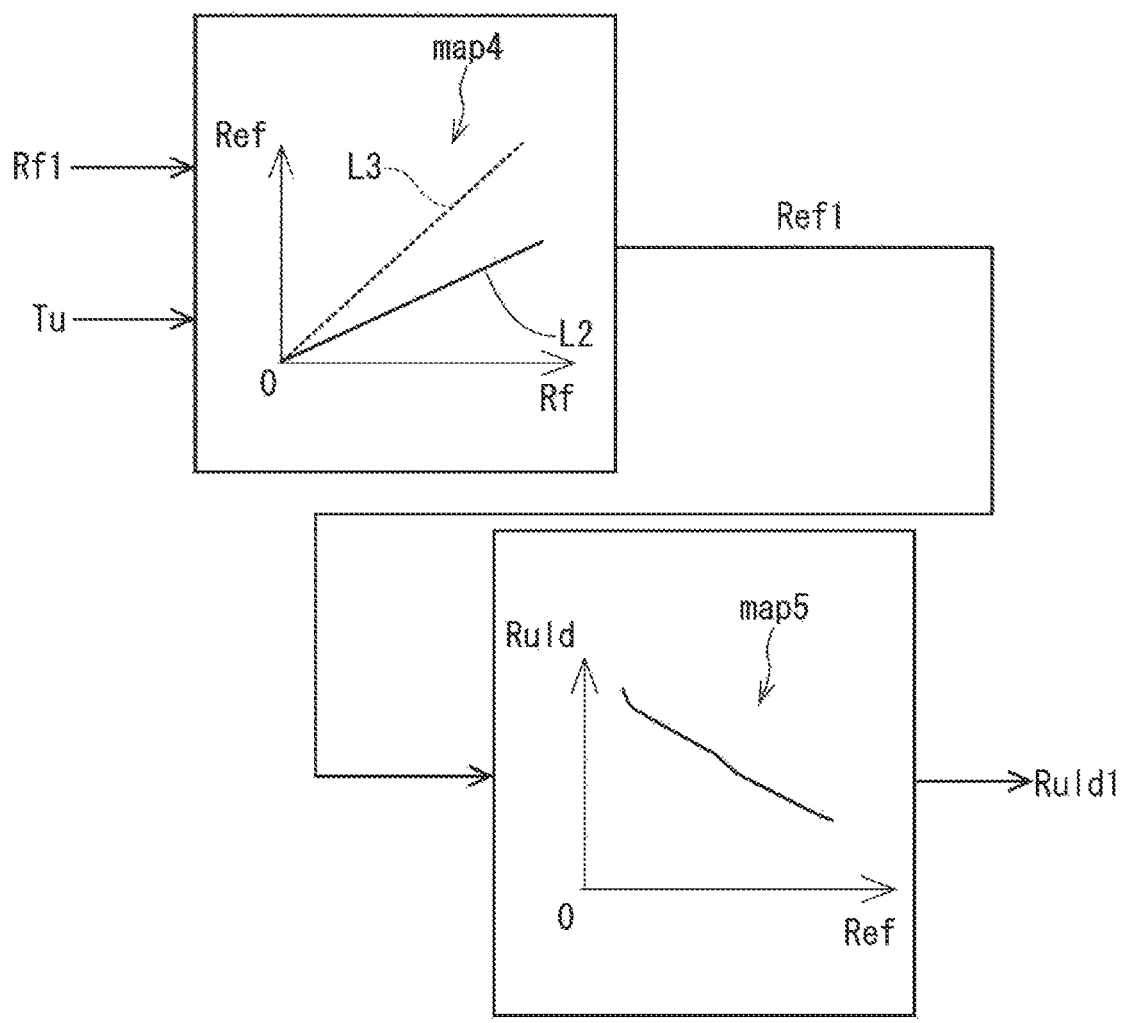
FIG. 8 illustrates a block diagram of an upper limit computation unit included in the control device for valve device according to the embodiment.

The upper limit computation unit 34 in advance includes upper-limit duty map map5 that represents the relationship between estimated failure rate Ref and upper-limit duty ratio Ruld. If estimated failure rate Ref is large, the fluid control valve 3 is likely to be unavailable due to the driving of the valve member 20. The duty ratio needs to be decreased. Therefore, upper-limit duty map map5 in FIG. 8 is configured to decrease upper-limit duty ratio Ruld as estimated failure rate Ref increases. The upper limit computation unit 34 computes upper-limit duty ratio Ruld1 corresponding to estimated failure rate Ref1 based on upper-limit duty map map5. The upper limit computation unit 34 outputs signal SRuld1 corresponding to upper-limit duty ratio Ruld1 to the actual duty computation unit 35.

The actual duty computation unit 35 computes actual duty ratio Rpd1 as a "new value of actual duty ratio" based on instruction duty ratio Rcd1 output from the instruction duty computation unit 31 and upper-limit duty ratio Ruld1 output from the upper limit computation unit 34. For example, actual duty ratio Rpd1 equals instruction duty ratio Rcd1 when instruction duty ratio Rcd1 is smaller than upper-limit duty ratio Ruld1. Actual duty ratio Rpd1 equals upper-limit duty ratio Ruld1 when instruction duty ratio Rcd1 is larger than upper-limit duty ratio Ruld1.

The actual duty computation unit 35 outputs actual duty ratio Rpd1 to the motor 153. Actual duty ratio Rpd1 is determined by a comparison between instruction duty ratio Rcd1 and upper-limit duty ratio Ruld1. The motor 153 drives the valve member 20 based on the externally supplied power and actual duty ratio Rpd1.

The alarm device 36 is electrically connected to the life computation unit 33. The alarm device 36 is assigned with upper limit LΣCa of total accumulative coefficient ΣCa (see map3 in FIG. 7). The alarm device 36 externally outputs an alarm when total accumulative coefficient ΣCa computed by using the life computation unit 33 reaches upper limit LΣCa or higher.

The control unit 1 according to the embodiment includes the stress computation unit 32 and the actual duty computation unit 35. The stress computation unit 32 computes valve member load torque Tqv as a stress on the fluid control valve 3 based on the rotation angle of the shaft 25 or actual duty ratio Rpd output to the motor 153, for example. The fluid control valve 3 normally determines a rotation angle of the shaft 25 based on actual duty ratio Rpd output to the motor 153. However, actual duty ratio Rpd output to the motor 153 may disagree with the actual rotation angle of the valve member 20 when the fluid control valve 3 is subject to an event that causes the valve member 20 to rotate abnormally. In consideration of this, the stress computation unit 32 computes valve member load torque Tqv as a stress on the valve member 20 based on the relationship between the actual duty ratio Rpd output to the motor 153 and the rotation angle of the shaft 25.

The actual duty computation unit 35 computes actual duty ratio Rpd output to the motor 153 based on instruction duty ratio Rcd computed by using the instruction duty computation unit 31 and valve member load torque Tqv computed by using the stress computation unit 32. The motor 153 drives the valve member 20 based on actual duty ratio Rpd. Therefore, the present embodiment is configured to drive the valve member 20 based on actual duty ratio Rpd that is computed as needed depending on the amount of stress on the fluid control valve 3 during the practical use. For example, when a foreign substance enters in between the first housing 10 and the valve member 20 or water used as fluid is frozen during the practical use of the fluid control valve 3, valve member load torque Tqv varies due to a force that impedes the rotation of the valve member 20. The control unit 1 computes actual duty ratio Rpd based on changes in valve member load torque Tqv corresponding to states of the fluid control valve 3. This configuration may enables to restrict the valve member 20 from being driven insomuch as to cause excessive stress that makes the fluid control valve 3 unavailable. The embodiment may enable to reliably restrict failures on the fluid control valve 3.

In an assumable configuration, in a case where reliable restriction of failures on the fluid control valve is prioritized, the upper limit of the actual duty ratio configured for the control unit may be relatively lowered before the shipment. However, the responsiveness of the fluid control valve may decrease if the upper limit of the actual duty ratio is relatively lowered. In this case, the fluid control valve may be incapable of exhibiting its characteristics sufficiently. According to the embodiment, for example, the fluid control valve controls the flow of cooling water for the engine. For the purpose of effective warm-up when the engine starts, it could be favorable to close the fluid control valve so that the flow of cooling water stops to approximate to the withstanding pressure of the cooling system. However, the fluid control valve is required to open at an early timing in case the responsiveness is degraded, and therefore may become incapable of effectively warming up the engine.

The control unit 1 according to the embodiment computes upper-limit duty ratio Ruld according to the amount of valve member load torque Tqv. This configuration may enable to relatively increase upper-limit duty ratio Ruld when valve member load torque Tqv is relatively small. The fluid control valve 3 may enable to maintain favorable responsiveness for a relatively long period.

The control unit 1 according to the embodiment causes the stress computation unit 32 to compute the amount of stress on the fluid control valve 3 and settles actual duty ratio Rpd based on the computation result. This configuration may enable to maintain favorable responsiveness while restricting failures on the fluid control valve 3.

The control unit 1 according to the embodiment includes the life computation unit 33. The life computation unit 33 computes accumulative coefficient Ca based on valve member load torque Tqv computed by using the stress computation unit 32 and the fatigue characteristics map map2. The life computation unit 33 computes total accumulative coefficient $\Sigma Ca$ resulting from accumulating computed accumulative coefficients Ca and computes failure rate Rf as the failure rate of the fluid control valve 3 at the present from total accumulative coefficient $\Sigma Ca$. The control unit 1 may enable to estimate the life of the fluid control valve 3 based on the total of stress accumulated on the fluid control valve 3. The control unit 1 may enable to reliably restrict failures on the fluid control valve 3.

The control unit 1 according to the embodiment includes the upper limit computation unit 34. The upper limit computation unit 34 computes upper-limit duty ratio Ruld based on failure rate Rf of the fluid control valve 3 computed by using the life computation unit 33 and operating time Tu of the fluid control valve 3. The actual duty computation unit 35 may enable to thereby compute actual duty ratio Rpd based on instruction duty ratio Rcd output from the instruction duty computation unit 31 and upper-limit duty ratio Ruld output from upper limit computation unit 34. The actual duty computation unit 35 may enable to determine actual duty ratio Rpd output to the motor 153 by using the relatively simple computation of comparing two numeric values. The control unit 1 may enable to reliably restrict failures on the fluid control valve 3.

The control unit 1 according to the embodiment is provided with lower limit LTqv of valve member load torque Tqv for the life computation unit 33 to compute accumulative coefficient Ca. The embodiment assumes accumulative coefficient Ca to be 0 when valve member load torque Tqv sent to the life computation unit 33 is lower than valve member load torque Tqv. This configuration may enable to restrict total accumulative coefficient $\Sigma Ca$ from being computed incorrectly due to the torque computed based on signal noise. This configuration may enable to reduce computation loads and improve the accuracy of accumulative coefficient Ca. The control unit 1 may enable to further improve the responsiveness.

The control unit 1 according to the embodiment includes the alarm device 36 that externally outputs an alarm when total accumulative coefficient $\Sigma Ca$ computed by using the life computation unit 33 exceeds the predetermined upper limit $L\Sigma Ca$. This configuration may enable to replace parts before the fluid control valve 3 fails, for example, to enable to avoid serious troubles such as incapability of the vehicle to travel.

In the control unit 1 according to the embodiment, the stress computation unit 32 stops computing of motor load torque Tqm for a predetermined period immediately after actual duty ratio Rpd changes from actual duty ratio Rpd at the previous time. When the actual duty computation unit 35 outputs actual duty ratio Rpd, the motor 153 is supplied with a voltage corresponding to a product resulting from multiplying a battery voltage and actual duty ratio Rpd. A relationship of first order lag arises between rotation speed Sv of the valve member 20 to be driven and a voltage applied to the motor 153. A certain amount of time is required until the rotation speed of the valve member 20 stabilizes. The control unit 1 restricts an error in the computation of motor load torque Tqm by stopping the computation of motor load torque Tqm for a predetermined period immediately after actual duty ratio Rpd changes from actual duty ratio Rpd at the previous time. This configuration may enable to improve the accuracy of total accumulative coefficient $\Sigma Ca$ and therefore further improve the responsiveness while reliably restricting failures on the fluid control valve 3.

The fluid control system 5 according to the embodiment includes the DC drive motor 153. The DC drive motor 153 may enable to uniquely determine the relationship between motor load torque Tqm and rotation speed Rn on the characteristics diagram in FIG. 6 based on voltage signal Ev and actual duty signal SRpd corresponding to actual duty ratio Rpd. This configuration may enable to improve the accuracy of motor load torque Tqm1 computed on the characteristics diagram illustrated in FIG. 6. The fluid control system 5 may enable to compute upper-limit duty ratio Ruld based on relatively highly accurate motor load torque Tqm1. This configuration may enable to improve the responsiveness while restricting failures on the fluid control valve 3.

The fluid control system 5 according to the embodiment includes the valve member 20 made of resin. A resin material may have no fatigue limit and therefore easily causes a failure during practical use. Suppression of a duty ratio and restriction of damage are required. The fluid control system 5 may enable to compute upper-limit duty ratio Ruld based on the information about material characteristics such as fatigue characteristics map map2 and strength design map map3. The fluid control system 5 is enabled to, therefore, compute upper-limit duty ratio Ruld according to material characteristics of the valve member 20 and restrict damage on the valve member 20.

The fluid control system 5 according to the embodiment drives the valve member 20 by using only a driving force generated from the motor 153. The sheets 162, 172, and 182 provide slide resistance acting on the valve member 20 rotating in the first housing 10. The rotational direction of the valve member 20 does not change the slide resistance. The fluid control system 5 maintains a constant slide torque regardless of rotation angles of the valve member 20, to enable to improve the accuracy of motor load torque Tqm. The fluid control system 5 may enable to further improve the responsiveness.

OTHER EMBODIMENTS

According to the above-described embodiment, the control unit includes the life computation unit and the upper limit computation unit. However, the life computation unit and the upper limit computation unit are omissible. When the life computation unit and the upper limit computation unit are omitted, a duty computation unit may compute a new value of the actual duty ratio based on a valve member load torque computed by using the stress computation unit. When the upper limit computation unit is omitted, the life computation unit may compute the life of the fluid control valve based on a valve member load torque computed by using the stress computation unit. The duty computation unit may compute a new value of the actual duty ratio based on the life. When the life computation unit is omitted, the upper limit computation unit may determine an upper-limit duty ratio based on a valve member load torque computed by using the stress computation unit and compute a new value of the actual duty ratio based on the upper-limit duty ratio.

According to the above-described embodiment, the "valve housing" includes four "housing-side openings." However, two or more housing-side openings may be needed.

The above-described embodiment computes an actual voltage supplied to the motor based on a voltage signal and an actual duty signal. However, an electric current may be computed.

The above-described upper limit computation unit computes an estimated failure rate based on the failure rate and the operating time of the fluid control valve. However, the method of computing an estimated failure rate is not limited thereto. The operating time as the "operating history" may be replaced by the mileage of the vehicle, the number of times to activate the starter, or the water temperature history. Only the failure rate may be used to compute an estimated failure rate.

According to the above-described embodiment, the fatigue characteristics map represents the relationship between the failure rate and the estimated failure rate in the upper limit computation unit. A change rate of the estimated failure rate to the failure rate depends on the lengths of the operating time of the fluid control valve. Therefore, there are a plurality of relationships between the failure rate and the estimated failure rate. However, there may be a single relationship between the failure rate and the estimated failure rate.

The above-described embodiment uses the DC drive motor. However, a motor is not limited to the DC drive motor.

According to the above-described embodiment, only the driving force generated from the motor drives the valve member. However, there may be another configuration to generate the drive torque to drive the valve member. For example, the valve device may include a pressing member that always maintains the closed state.

According to the above-described embodiment, the valve member is formed of resin. However, the material to form the valve member is not limited thereto.

The present disclosure is not limited to the above-mentioned embodiment illustrated in the accompanying drawings but may be variously modified within the spirit and scope of the disclosure.

The present disclosure has been described based on the embodiment. However, the present disclosure is not limited to the embodiment and the structure. The present disclosure includes various modifications and modifications within a comparable scope. Besides, the category or the scope of the idea of the present disclosure covers various combinations or forms and the other combinations or forms including only one element or more or less in the former.

The invention claimed is:

1. A control device configured to control driving of a valve device, the valve device including:
   a valve housing that has an internal space and a plurality of housing-side openings, the housing-side openings configured to communicate the internal space with an outside of the valve housing;
   a valve member that is rotationally accommodated in the valve housing and is configured to communicate and discommunicate the housing-side openings with the internal space;
   a driving device that is configured to generate a driving force by using externally supplied electric power to rotate the valve member; and
   a rotation angle detector that is configured to detect an actual rotation angle of the valve member, wherein
   the control device comprises:
   an instruction duty computation unit configured to compute an instruction duty ratio representing a ratio between an energization time and a non-energization time of the driving device based on an actual rotation angle detected by using the rotation angle detector and a target rotation angle of the valve member;
   a stress computation unit configured to compute a stress on the valve member based on the actual rotation angle and an actual duty ratio of the driving device;
   an actual duty computation unit configured to compute a new value of the actual duty ratio based on the instruction duty ratio computed by using the instruction duty computation unit and the stress computed by using the stress computation unit; and a life computation unit that is configured to compute a life of the valve device based on the stress computed by using the stress computation unit, wherein the actual duty computation unit is configured to compute the new value of the actual duty ratio based on the life of the valve device computed by using the life computation unit.

2. The control device according to claim 1, wherein the life computation unit is configured to compute an accumulative coefficient based on the stress computed by using the stress computation unit and to compute a failure rate of the valve device from a sum of the accumulative coefficient.

3. The control device according to claim 1, wherein the life computation unit is configured to compute the life of the valve device based on the stress larger than a lower limit of the stress.

4. The control device according to claim 1, wherein the stress computation unit is configured to compute a rotation speed of the valve member based on the actual rotation angle and to compute a slide resistance of the valve member from the rotation speed, which is the stress.

5. The control device according to claim 1, further comprising:

an alarm device configured to notify that an accumulated value of the stress computed by using the stress computation unit is greater than or equal to a predetermined upper limit when the accumulated value becomes greater than or equal to the predetermined upper limit.

6. The control device according to claim 1, wherein the stress computation unit is configured to stop computing the stress on the valve member for a predetermined period immediately after the actual duty ratio changes from the actual duty ratio at a previous time.

7. A fluid control system comprising:
the valve device according to claim 1; and
the control device according to claim 1.

8. The fluid control system according to claim 7, wherein the valve member is made of resin.

9. The fluid control system according to claim 7, wherein the driving device is a direct-current motor.

10. The fluid control system according to claim 7, wherein the valve member is configured to slide against a valve-housing internal wall; and the valve member is configured to maintain a constant slide resistance.

11. A control device configured to control driving of a valve device, the valve device including:

a valve housing that has an internal space and a plurality of housing-side openings, the housing-aide openings configured to communicate the internal space with an outside of the valve housing;

a valve member that is rotationally accommodated in the valve housing and is configured to communicate and discommunicate the housing-side openings with the internal space;

a driving device that is configured to generate a driving force by using externally supplied electric power to rotate the valve member; and a rotation angle detector that is configured to detect an actual rotation angle of the valve member, wherein the control device comprises:

an instruction duty computation unit configured to compute an instruction duty ratio representing a ratio between an energization time and a non-energization time of the driving device based on an actual rotation angle detected by using the rotation angle detector and a target rotation angle of the valve member;

a stress computation unit configured to compute a stress on the valve member based on the actual rotation angle and an actual duty ratio of the driving device;

an actual duty computation unit configured to compute a new value of the actual duty ratio based on the instruction duty ratio computed by using the instruction duty computation unit and the stress computed by using the stress computation unit;

a life computation unit that is configured to compute the life of the valve device based on the stress computed by using the stress computation unit; and an upper limit computation unit that is configured to compute an upper-limit duty ratio based on the life of the valve device computed by using the life computation unit and an operating history of the valve device, wherein the actual duty computation unit is configured to compute the new value of the actual duty ratio based on the upper-limit duty ratio computed by using the upper limit computation unit.

12. The control device according to claim 11, wherein the upper limit computation unit is configured to compute an estimated failure rate of the valve device based on the life of the valve device computed by using the life computation unit and an operating time of the valve device and to compute the upper-limit duty ratio based on the estimated failure rate.

* * * * *